(12) United States Patent
Tsushima (10) Patent No.: US 9,420,067 B2
(45) Date of Patent: Aug. 16, 2016

(54) CONTENT PROVIDING SYSTEM AND CONTROL METHOD THEREOF

(71) Applicant: SQUARE ENIX HOLDINGS CO., LTD., Tokyo (JP)

(72) Inventor: Tadashi Tsushima, Tokyo (JP)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 376 days.

(21) Appl. No.: 13/899,750

(22) Filed: May 22, 2013

(65) Prior Publication Data

US 2014/0006485 A1   Jan. 2, 2014

(30) Foreign Application Priority Data

Jun. 28, 2012   (JP) .................................. 2012-146068

(51) Int. Cl.
 *H04L 29/06* (2006.01)
 *G06F 3/14* (2006.01)

(52) U.S. Cl.
 CPC ........ *H04L 67/42* (2013.01); *G06F 3/14* (2013.01); *H04L 67/38* (2013.01); *G09G 2350/00* (2013.01); *G09G 2370/022* (2013.01); *H04L 29/06* (2013.01)

(58) Field of Classification Search
 USPC ............... 709/223, 218, 230; 348/E7.071; 345/505, 419
 See application file for complete search history.

(56) References Cited

U.S. PATENT DOCUMENTS

| | | | |
|---|---|---|---|
| 6,273,821 B1 | 8/2001 | Moriguchi | |
| 8,001,210 B2 | 8/2011 | Minagawa et al. | |
| 8,154,553 B2 | 4/2012 | Peterfreund | |
| 8,264,493 B2 | 9/2012 | Peterfreund | |
| 2002/0032751 A1* | 3/2002 | Bharadwaj | H04L 29/06 709/218 |
| 2009/0278842 A1 | 11/2009 | Peterfreund | |
| 2009/0289945 A1* | 11/2009 | Peterfreund | A63F 13/12 345/505 |
| 2010/0041481 A1* | 2/2010 | Smedley | A63F 13/12 463/42 |
| 2012/0299938 A1 | 11/2012 | Iwasaki | |
| 2013/0123000 A1* | 5/2013 | Kusuda | A63F 13/12 463/25 |
| 2015/0011318 A1 | 1/2015 | Takahashi | |

FOREIGN PATENT DOCUMENTS

| | | |
|---|---|---|
| JP | 2000-189667 | 7/2000 |
| JP | 2009-000163 | 1/2009 |
| JP | 2013-165933 | 8/2013 |
| WO | 2009/138878 | 11/2009 |

OTHER PUBLICATIONS

U.S. Appl. No. 13/899,663 to Tadashi Tsushima, filed May 22, 2013.
U.S. Appl. No. 13/817,171 to Tetsuji Iwasaki, filed Feb. 15, 2013.
U.S. Appl. No. 13/938,612 to Tetsuji Iwasaki, filed Jul. 10, 2013.
Office Action from Japan Patent Office (JPO) in Japanese Patent Appl. No. 2012-146068, dated May 30, 2016, together with a partial English language translation.

\* cited by examiner

*Primary Examiner* — Kyung H Shin (74) *Attorney, Agent, or Firm* — Greenblum & Bernstein, P.L.C.

(57) ABSTRACT

In a content providing system, a server provides a screen rendered according to operation input made on a first device to a second device. The first device transmits, to the server, operation input data that indicates detected operation input. The server receives the operation input data from the first device, updates data for generating a screen and renders a screen according to the updated data for generating the screen. Next, the server transmits the rendered screen to the second device.

12 Claims, 6 Drawing Sheets

CONTENT PROVIDING SYSTEM AND CONTROL METHOD THEREOF

BACKGROUND OF THE INVENTION

1. Field of the Invention

The present invention relates to a content providing system, a control method thereof, and particularly to a streaming distribution technique for encoded video data.

2. Description of the Related Art

The present invention relates to a content providing system and a control method, and particularly to a technique of loading static data into shared memory.

BACKGROUND ART

Client devices such as personal computers (PCs) capable of network connection have become widespread. Along with the widespread use of devices, the network population of the Internet is increasing. Various services using the Internet have recently been developed for network users, and entertainment services such as games are also provided.

One of the services for network users is a multiuser online network game such as MMORPG (Massively Multiplayer Online Role-Playing Game). In a multiuser online network game, a user connects his/her client device to a server that provides the game, thereby doing match-up play or team play with another user who uses another client device connected to the server.

In a general multiuser online network game, each client device sends/receives data necessary for game rendering to/from the server. The client device performs rendering processing using the received data necessary for rendering and presents the generated game screen to a display device connected to the client device, thereby providing the game screen to the user. Information the user has input by operating an input interface is sent to the server and used for calculation processing in the server or transmitted to another client device connected to the server.

However, some network games that cause a client device to perform rendering processing require a user to use a PC having sufficient rendering performance or a dedicated game device. For this reason, the number of users of a network game (one content) depends on the performance of the client device required by the content. A high-performance device is expensive, as a matter of course, and the number of users who can own the device is limited. That is, it is difficult to increase the number of users of a game that requires high rendering performance, for example, a game that provides beautiful graphics.

In recent years, however, there are also provided games playable by a user without depending on the processing capability such as rendering performance of a client device. In a game as described in International Publication No. 2009/138878, a server acquires the information of an operation caused in a client device and provides, to the client device, a game screen obtained by performing rendering processing using the information.

Meanwhile, there have been cases in which for the control of content, such as a game, which is executed on one device, another registered device, such as a mobile phone, is used as an operation interface. However, in the case where this method is implemented in a game system as described in International Publication No. 2009/138878, for game contents, expressions provided to a user for which operation is possible, are limited by communication formats between devices, by platforms and so on. Specifically, the expressions may be limited on the part that brings interest to the user due to nonessential restrictions against the expressions which are to be provided to the user.

SUMMARY OF THE INVENTION

The present application was made in view of such problems in the conventional technique. The present invention provides a content providing system, and a control method thereof, that realizes a content service in which it is possible to provide a wide range of operation input to a user.

According to one aspect of the present invention, there is provided a content providing system in which a server provides a screen, that the server rendered according to operation input carried out on a first device, to a second device, wherein the first device comprises: a detection unit configured to detect operation input carried out on the first device; and a first transmission unit configured to transmit operation input data indicating operation input detected by the detection unit to the server, the server comprises: a first receiving unit configured to receive the operation input data from the first device; an updating unit configured to update data for screen generation according to the operation input data received from the first receiving unit; a rendering unit configured to render a screen according to data for screen generation updated by the updating unit; and a second transmission unit configured to transmit a screen rendered by the rendering unit, and the second device comprises: a second receiving unit configured to receive a screen from the server; and a first display control unit configured to display on the first display unit, to which it is connected, a screen received from the second receiving unit.

According to another aspect of the present invention, there is provided a control method for a content providing system in which a server provides a screen, that the server rendered according to operation input carried out on a first device, to a second device, the control method comprising: in the first device: a detection step in which a detection unit of the first device detects operation input carried out on the first device; and a first transmission step in which a first transmission unit of the first device transmits operation input data indicating operation input detected in the detection step to the server, in the server: a first receiving step in which a first receiving unit of the server receives the operation input data from the first device; an updating step in which an updating unit of the server updates data for screen generation according to the operation input data received in the first receiving step; a rendering step in which a rendering unit of the server renders a screen according to data for screen generation updated in the updating step; and a second transmission step in which a second transmission unit of the server transmits a screen rendered by the rendering unit, and in the second device: a second receiving step in which a second receiving unit of the second device receives a screen from the server; and a first display control step in which a first display control unit of the second device displays on the first display unit, to which it is connected, a screen received in the second receiving step.

Further features of the present invention will become apparent from the following description of exemplary embodiments (with reference to the attached drawings).

DESCRIPTION OF THE EMBODIMENTS

The details of exemplary embodiments of the present invention will be explained referring to the drawings. Note, an embodiment explained below is an example in which the present invention is applied to an example of a content providing system including a server 200 which distributes game content, a portable terminal 100 functioning as a first device that receives an operation input, and a PC 300 functioning as a second device that displays a screen distributed from the server.

<Configuration of the Game System>

Figure 1:
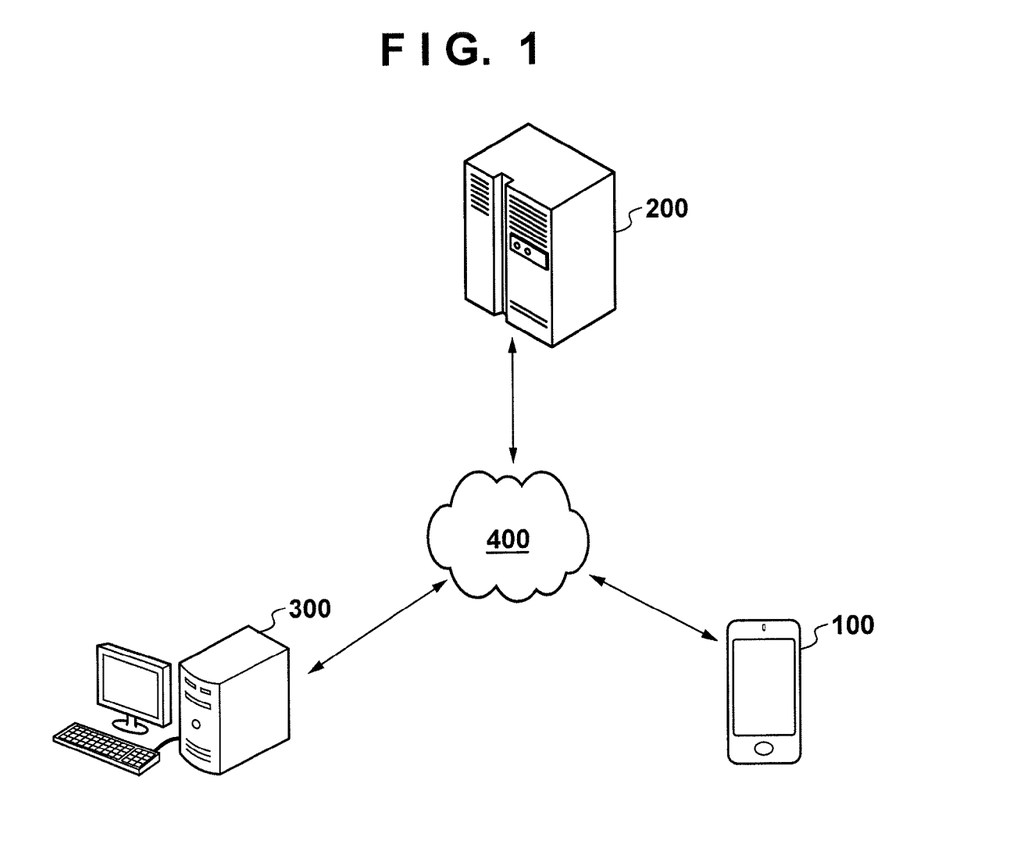
FIG. 1 is a view that illustrates a system configuration of a game system according to an embodiment of the present invention.

FIG. 1 is a view that illustrates a system configuration of a game system according to an embodiment of the present invention.

As shown in the FIG. 1, the server 200 and the portable terminal 100, and the server 200 and the PC 300 are connected via a network 400 such as the Internet. In the present embodiment, the server 200 provides, via the network 400, game content that can be tried. In the present embodiment, the server 200 provides different features of game content respectively to the portable terminal 100 and to the PC 300.

On game systems in which data is exchanged over a network, there necessarily is a time lag from the time that operation input is performed to the time that a game screen updated according to this operation input is provided to a user. In particular, it is difficult to get rid of the influence of a time lag for a game screen that is provided using the rendering capability of the server 200, such as a main game screen provided as game content (a screen in which a game field, a character or the like is displayed).

Meanwhile, it is difficult for a user to recognize whether an operation input was performed correctly in the case where for a secondary game screen, for which responsiveness of display update is required, is provided through rendering processing on the server 200, such as a command determination screen for which screen transition is performed in accordance with operation input. Accordingly, there is the possibility that this will cause the user's interest to wane. For this reason, in the game system of the present embodiment, game content features are provided to the portable terminal 100 and to the PC 300 having been separated based on whether or not a time lag is acceptable. Specifically, a feature corresponding to display of a main game screen, for which responsiveness to operation input is not required, is provided to the PC 300. Also, an operation input detection function or a function corresponding to display of a secondary game screen, for which responsiveness to operation input is required, is provided to the portable terminal 100. Note, in the game system of the present embodiment, it is preferable that the game content provided by the server 200 be game content of a type in which after a finale command is determined, a corresponding game screen is displayed, rather than a game, such as a so-called action game, for which responsiveness is required for a main game screen, but embodiment of the invention is not limited to this.

Also, in the present embodiment, explanation is made using the portable terminal 100 and the PC 300 as client devices that connect to the server 200, but embodiment of the invention is not limited to this. For example, the portable terminal 100 may be a device, such as a portable game device, a mobile phone, a PDA, a tablet or the like, having a communication function, an operation input search function, and preferably an image rendering function. Also, the PC 300 may be a device, such as a game console, a set top box, a portable game device, a PDA, a tablet or the like, having a communication function and the ability to decode and playback encoded video data.

Note, in embodiments of the present invention, data communication between the portable terminal 100 and the PC 300 is not necessary, and the user may use the game content provided by the server 200 on the portable terminal 100 and the PC 300 as though they were being synchronized.

<Configuration of the Portable Terminal 100>

Figure 2:
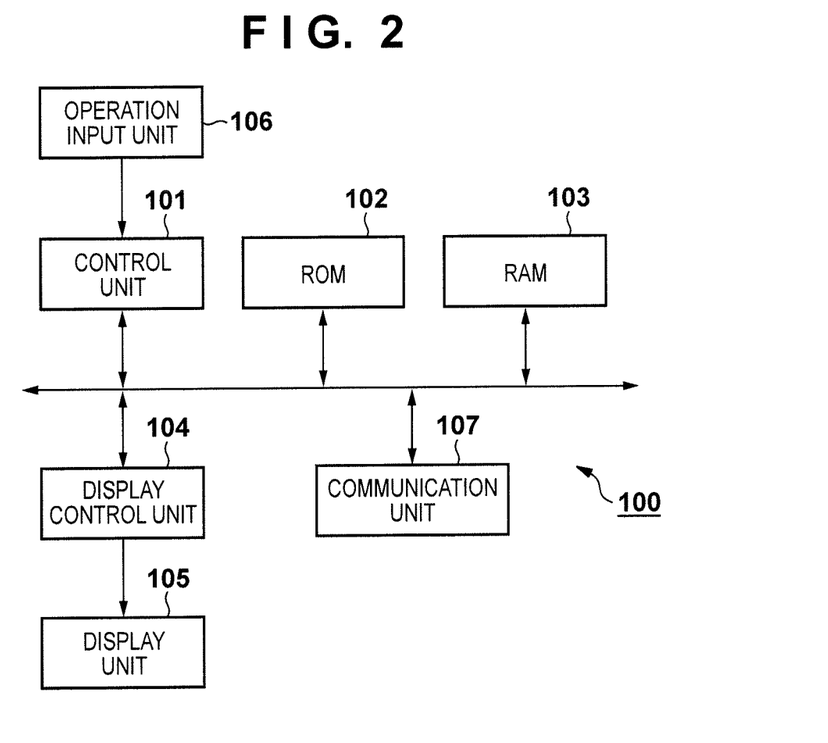
FIG. 2 is a block diagram that illustrates a functional configuration of a portable terminal 100 according to an embodiment of the present invention.

FIG. 2 is a block diagram that illustrates a functional configuration of the portable terminal 100 according to an embodiment of the present invention.

A control unit 101 is for example a CPU or the like. The control unit 101 controls the operation of each block in the portable terminal 100. Specifically, the control unit 101 controls the operation of each block by, for example, reading out an operation program for the block stored in a ROM 102, loading it into a RAM 103 and executing it.

The ROM 102 is, for example, a rewritable, non-volatile memory. The ROM 102 stores, on top of an operation program for each block in the portable terminal 100, information such as parameters necessary for the operation of each block. In the parameters, information such as a MAC address which individually identifies the portable terminal 100 may be included. Also, in the present embodiment, a program corresponding to a web browser application is stored in the ROM 102.

The RAM 103 is a volatile memory. The RAM 103 functions not only as an area to load operation programs of the blocks in the portable terminal 100, but also as a storage area in which such things as intermediate data output in the operation of the blocks is stored. In the present embodiment, data received from the server 200 due to access of the server 200 in a web browser application is buffered in the RAM 103.

A display unit 105 is a display apparatus of the portable terminal 100 such as, for example, an LCD or the like. Presentation of images to the display unit 105 is controlled by a display control unit 104.

An operation input unit 106 is a user interface including, for example, a button (not shown) of the portable terminal 100. When the operation input unit 106 detects a user operation input on a user interface, it transmits a control signal corresponding to the operation details to the control unit 101. Note, in the present embodiment, the display unit 105 may be a touch panel display, in which case user touch input (depending on the detection method, this may include non-touching proximity input) made on the surface of the display unit 105 is detected by the operation input unit 106.

A communication unit 107 is a communication interface of the portable terminal 100. In the present embodiment, the user can initiate data communication by launching a web browser application on the portable terminal 100 and connecting to the server 200 via the communication unit 107.

<Configuration of the Server 200>

Figure 3:
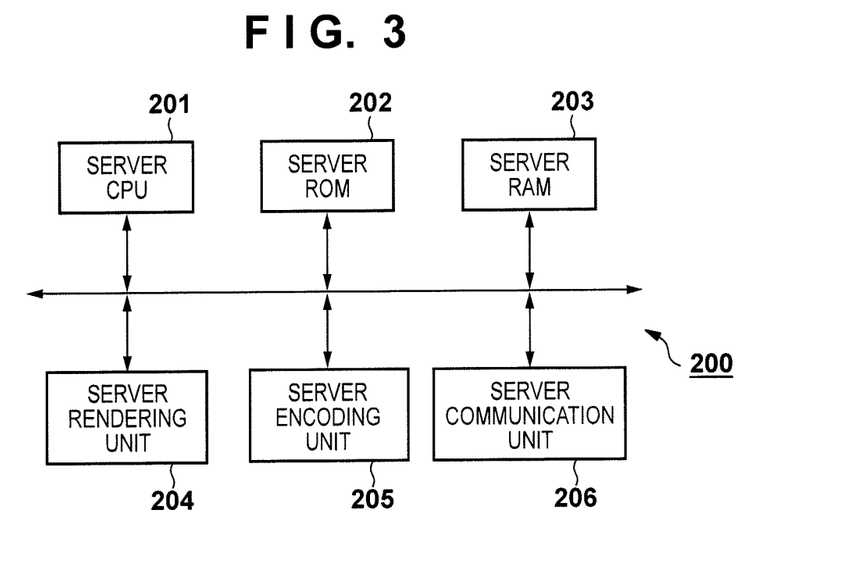
FIG. 3 is a block diagram that illustrates a functional configuration of a server 200 according to an embodiment of the present invention.

FIG. 3 is a block diagram that illustrates a functional configuration of the server 200 according to an embodiment of the present invention.

A server CPU 201 controls the operation of each of the blocks in the server 200. Specifically, the server CPU 201 controls the operation of each block by, for example, reading out an operation program for the block stored in a server ROM 202, loading it into a server RAM 203 and executing it.

Figure 7A:
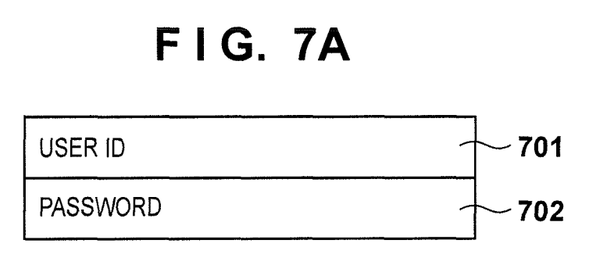
FIGS. 7A and 7B are views for explaining information that is managed in the server 200 according to an embodiment of the present invention.

The server ROM 202 is, for example, a rewritable, non-volatile memory. The server ROM 202 stores, on top of an operation program for each block in the server 200, information such as parameters necessary for the operation of each block. In the present embodiment, account information of users of a service that the server 200 provides is managed in the server ROM 202. The account information may be managed with, for example, a password 702 associated with a user ID 701 as shown in FIG. 7A.

Figure 7B:
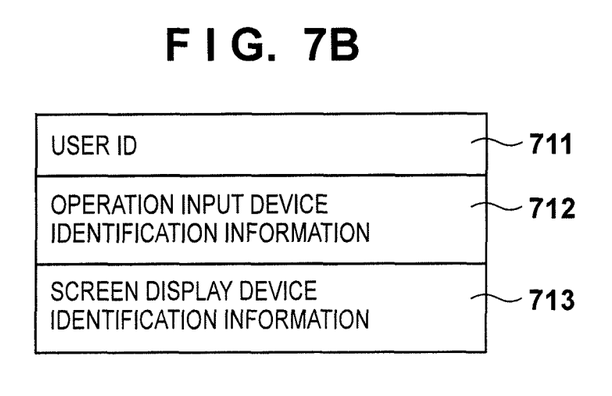

The server RAM 203 is a volatile memory. The server RAM 203 functions not only as an area to load operation programs of the blocks in the server 200, but also as a storage area in which such things as intermediate data output in the operation of the blocks is stored. In the present embodiment, information of the devices used (the portable terminal 100 and the PC 300) for users that are currently using a service is managed in the server RAM 203. Specifically, as shown in FIG. 7B, operation input device identification information 712 and screen display device identification information 713 is associated with a user ID 711 and managed in the server RAM 203. Note, device identification information may be identification information unique to the device by which the server 200 can individually identify it such as, for example, a MAC address of the device.

A server rendering unit 204 is, for example, a GPU, which renders game screens for game content provided as a service. For example, in a case where content is provided as a 3 dimensional game screen, the server rendering unit 204 receives information of rendering objects included in the rendering scope from the server CPU 201, and generates game screens by sequentially rendering into VRAM (not shown).

A server encoding unit 205 generates encoded video data by encoding game screens generated by the server rendering unit 204. In the present embodiment, a game screen provided to the PC 300 by the server 200 is transmitted as a frame of video data encoded in a predetermined format. This is in order to reduce the transferred data size for the provision of a game screen, but embodiment of the present invention is not limited to a method of providing game screens.

A server communication unit 206 is a communication interface of the server 200. The server 200 can function as a Web server and perform data communication with external devices via the server communication unit 206. In the present embodiment, the server 200 transmits, in a streaming method, encoded video data generated in the server encoding unit 205 to the PC 300.

<Configuration of the PC 300>

Figure 4:
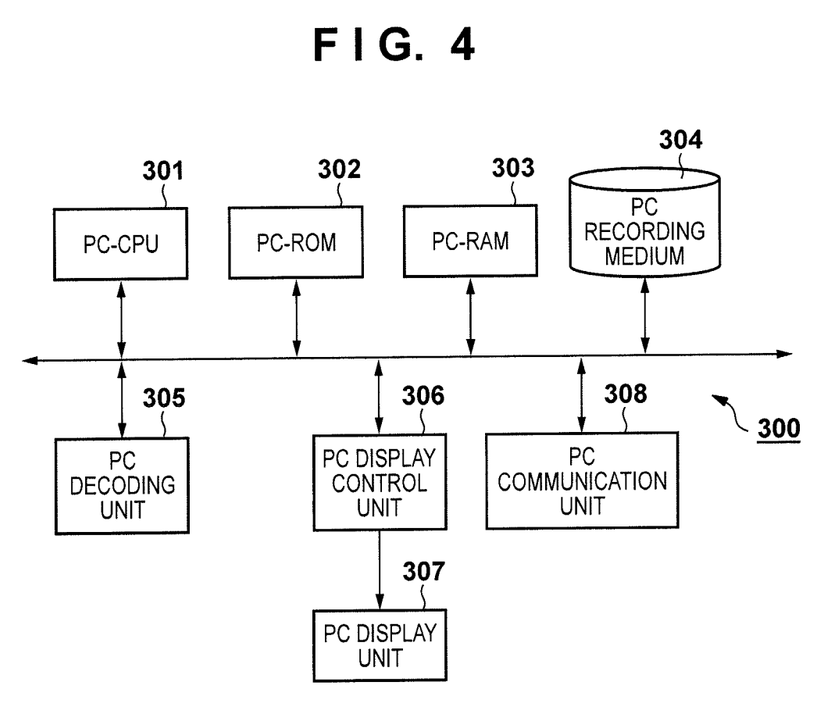
FIG. 4 is a block diagram that illustrates a functional configuration of a PC 300 according to an embodiment of the present invention.

FIG. 4 is a block diagram that illustrates a functional configuration of the PC 300 according to an embodiment of the present invention.

A PC CPU 301 controls the operation of each block in the PC 300. Specifically, the PC CPU 301 controls the operation of each block by, for example, reading out an operation program for the block stored in a PC ROM 302 or a PC recording medium 304, loading it into a PC RAM 303 and executing it.

The PC ROM 302 is, for example, a rewritable, non-volatile memory. The PC ROM 302 stores, on top of an operation program for each block in the PC 300, information such as parameters necessary for the operation of each block. Similarly to the case of the portable terminal 100, the parameters include individual identification information of the PC 300.

The PC RAM 303 is a volatile memory. The PC RAM 303 functions not only as an area to load operation programs of the blocks in the PC 300, but also as a storage area in which such things as intermediate data output in the operation of the blocks is stored.

The PC recording medium 304 is a recording device connected to the PC 300 such as, for example, an HDD. The PC recording medium 304 may store a program for a web browser application which causes blocks in the PC 300 to operate.

A PC communication unit 308 is a communication interface of the PC 300. The PC 300 communicates with the server 200 via the PC communication unit 308. In the present embodiment, the PC communication unit 308 receives encoded video data generated by the server 200.

A PC decoding unit 305 generates game screens to provide to a user by decoding encoded video data received from the server 200. Obtained game screens are transmitted to a PC display control unit 306.

A PC display unit 307 is, for example, an LCD that is built into the PC 300, or is a display apparatus connected to the PC 300. Screen provision to the PC display unit 307 is controlled by the PC display control unit 306. In the present embodiment, the PC display control unit 306 provides game screens decoded by the PC decoding unit 305 to the PC display unit 307.

<Game Processing>

Figure 5:
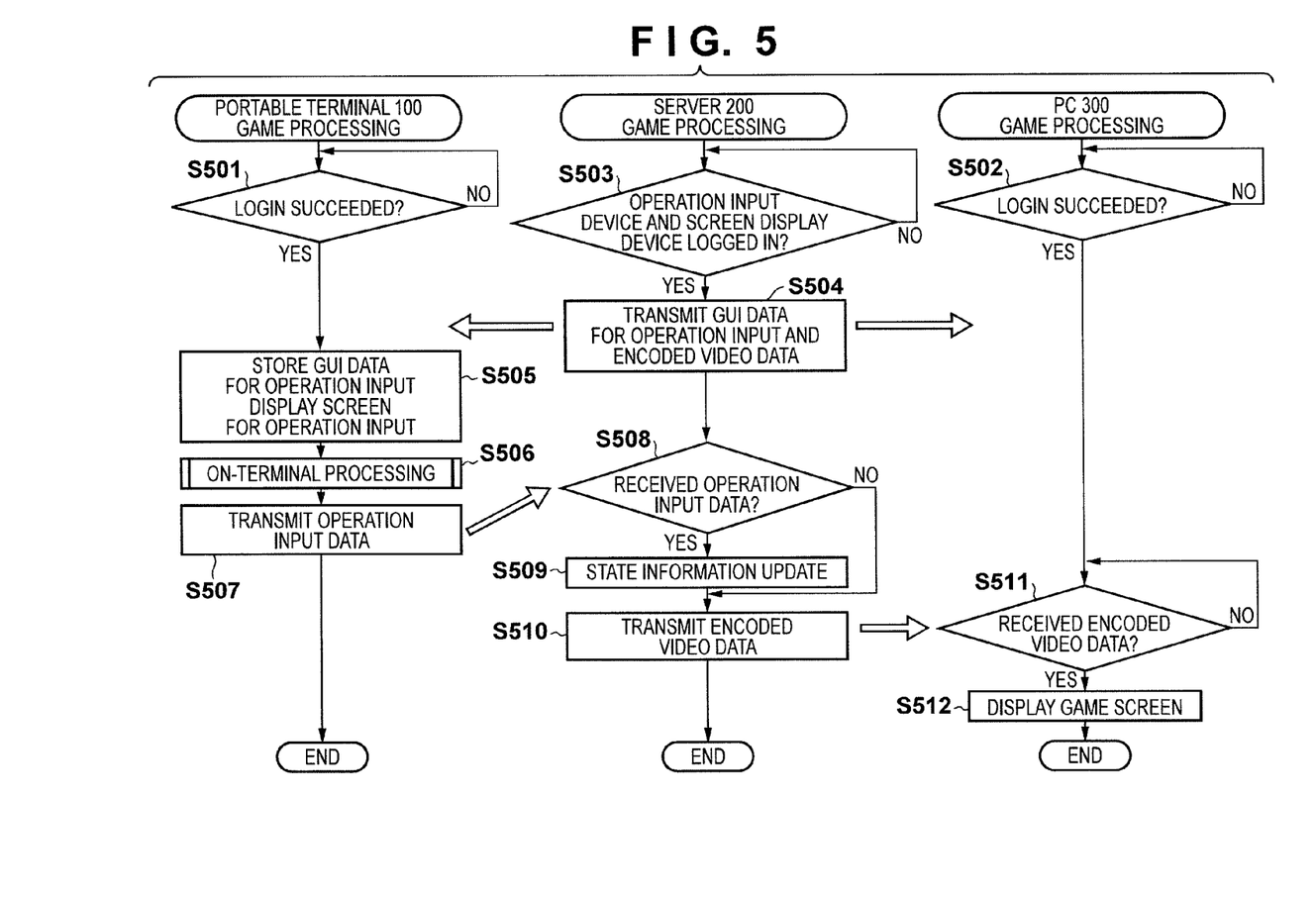
FIG. 5 is a flow chart that exemplifies game processing that is performed in a game system according to an embodiment of the present invention.

Specific processing will be explained using the flow chart in FIG. 5 for game processing in the game system of the present embodiment having this kind of configuration. Processing corresponding to this flowchart is performed by the control unit 101, the server CPU 201 or the PC CPU 301. Note, this game processing will be explained as something that is initiated when a user launches a web browser application on the portable terminal 100 or the PC 300 and accesses the server 200.

Firstly, in step S501, the control unit 101 receives input of account information from the user, and determines whether or not login to a service provided by the server 200 succeeded. Specifically, the control unit 101 determines whether or not login to a service succeeded by determining whether or not the communication unit 107 received, for example, a return message when the login succeeded from the server 200 indicating that the login succeeded. When the control unit 101 determines that login to a service did succeed, it moves the processing on to step S505, and in the case where the login did not succeed, it repeats the processing of this step.

In step S502, the PC CPU 301 receives account information input from the user and determines whether or not login to a service that the server 200 provides succeeded. Specifically, the PC CPU 301 determines whether or not login to a service succeeded by determining whether or not the PC communication unit 308 received, for example, a return message when the login succeeded from the server 200 indicating that the login succeeded. When the PC CPU 301 determines that login to a service did succeed, it moves the processing on to step S511, and in the case where login did not succeed, it repeats the processing of this step.

In step S503, the server CPU 201 determines whether or not login to a service succeeded on both an operation input device (the portable terminal 100) and a screen display device (the PC 300) for a user ID that is a target of service provision. Specifically, when there is a request to login to a service, the server CPU 201 checks the validity of account information included in the login request. Next, in a case where the validity of a login request was confirmed, the server CPU 201 associates the user ID that is logging in, and identification information of the device being used to log in, and stores this in the server RAM 203.

Note, in the present embodiment, the types of devices that can be operation input devices and devices that can be screen display devices are predetermined. When the server CPU 201 receives a login request from a target device, the server CPU 201 determines what device is being used for the login, associates identification information of the device as information corresponding to either operation input device identification information or screen display device identification information with the user ID, and stores this in the server RAM 203. However, embodiment of the present invention is not limited to this, and a configuration may be taken in which 2 devices are registered by selecting whether to login the device as an operation input device or a screen display device when logging in to the server 200.

In a case where the server CPU 201 determines that login has succeeded for both an operation input device and a screen display device for a provision target user ID, it moves the processing to step S504, and when it determines that login has not succeeded for both devices, it repeats the processing of this step.

In step S504, the server CPU 201, transmits GUI data for game content operation input from the server communication unit 206 to the portable terminal 100 registered as an operation input device. Note, the GUI data for operation input is not fixed image data but rather it is at least GUI data for a screen for multiple operation input that can correspond to screen transition according to operation input. Also, regarding the GUI data provided to the portable terminal 100, different GUI data may be provided in accordance with a game procedure, such as, for example, a change due to an operation character level increasing.

Also, in this step, the server CPU 201 initiates provision of encoded video data to the PC 300 registered as the screen display device. Specifically, the server CPU 201, after causing the server rendering unit 204 to render a game screen according to state information indicated by the current game procedure, causes encoded video data to be generated by causing the server encoding unit 205 to encode the obtained game screen. Next, the server CPU 201 transmits the generated encoded video data to the server communication unit 206, which transmits it to the PC 300.

The server CPU 201, after executing this step, moves the processing on to step S508.

In the step S505, the control unit 101 stores GUI data for operation input received from the server 200 in the RAM 103. Next, the control unit 101 transmits a secondary screen for operation input generated using the GUI data, out of stored GUI data, that corresponds to current state information to the display control unit 104, thereby causing it to be displayed on the display unit 105. Note, regarding state information indicating current game procedure, at least information necessary for defining a secondary screen for operation input is provided from the server 200 to the portable terminal 100. Also, the secondary screen is provided over a web browser application launched on the portable terminal 100.

In step 506, the control unit 101 performs on-terminal processing that determines whether or not to transmit operation input done by the user on the portable terminal 100 to the server 200. The details of this on-terminal processing are described later. However, in the present embodiment, by performing on-terminal processing on the portable terminal 100, it is possible to transmit operation details for operation input made on the portable terminal 100 to the server 200 only in a case where they need to be reflected in a game screen. In other words, for operation input that does not need to be reflected in a game screen, the control unit 101 can complete processing corresponding to the operation input within the portable terminal 100.

In step 507, the control unit 101 converts information of operation input performed on the portable terminal 100 according to a data management format of the game content and transmits it as operation input to the server 200 via the communication unit 107. The conversion processing performed in this step is processing that converts information of a coordinate (or of a trajectory) upon which operation input is detected in analog on a touch panel, for example, into game data such as a selected command, a movement direction or the like.

In step S508, the server CPU 201 determines whether or not operation input data was received from the portable terminal 100 in the server communication unit 206. In a cases where the server CPU 201 determines that operation input data was received, it moves the processing on to step S509, and in the case where it determines operation input data was not received it moves the processing on to step S510.

In step S509, the server CPU 201 updates state information stored in the server RAM 203 according to the operation input data.

In step S510, the server CPU 201, after causing the server rendering unit 204 to render a game screen according to the state information stored in the server RAM 203, causes generation of encoded video data by causing the server encoding unit 205 to encode the obtained game screen. Next, the server CPU 201 transmits the generated encoded video data to the server communication unit 206, which transmits it to the PC 300.

In step S511, the PC CPU 301 determines whether or not encoded video data was received from the server 200 in the PC communication unit 308. In a case where the PC CPU 301 determines that encoded video data was received it moves the processing on to set S512, and when it determines that encoded video data was not received, it repeats the processing of this step.

In the step S512, the PC CPU 301 causes generation of a game screen corresponding to the current frame by causing the PC decoding unit 305 to decode the received encoded video data. Next, the PC CPU 301 transmits the generated game screen to the PC display control unit 306, thereby causing it to be displayed on the PC display unit 307.

In this way, in the game system of the present embodiment, it is possible to assign the roles of an operation input device and a screen display device for game content that is provided by the server 200 to different devices on a network. Note, in this game processing, the processing of steps S506 through S512 is repetitively performed according to a generation time interval of game screens the server 200 provides.

<On-terminal Processing>

Figure 6:
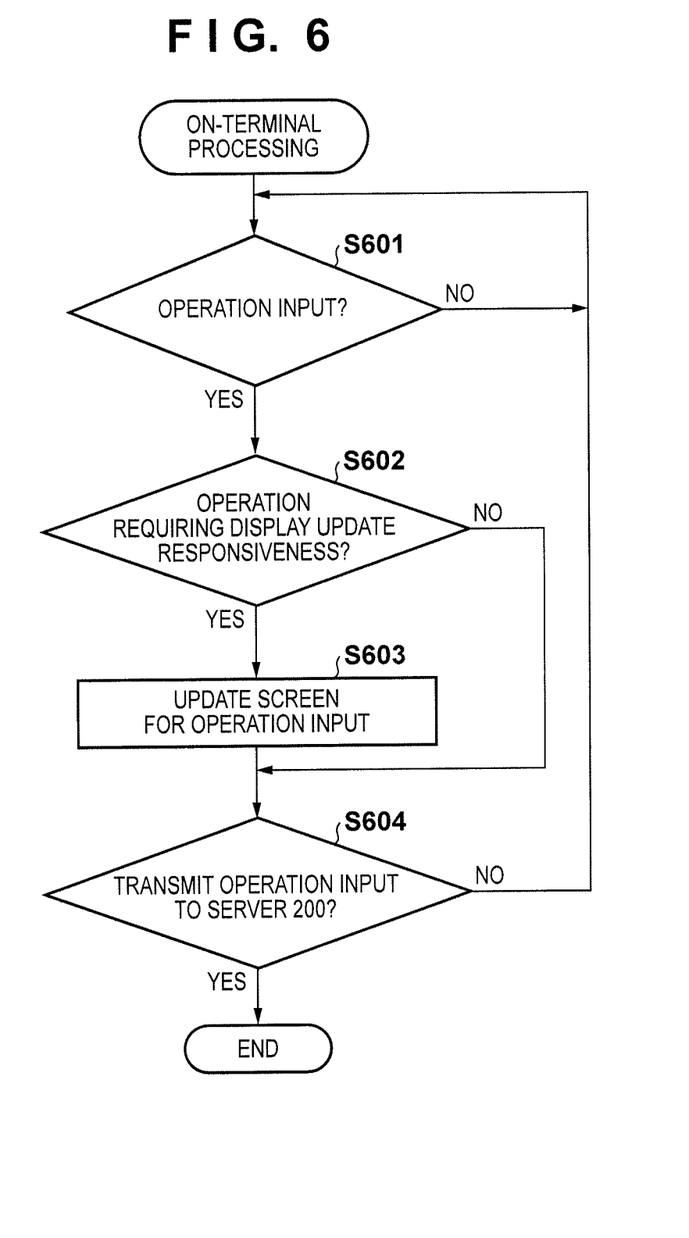
FIG. 6 is a flow chart that exemplifies on-terminal processing that is performed on the portable terminal 100 according to an embodiment of the present invention.

FIG. 6 is a flow chart that exemplifies on-terminal processing that is performed in the portable terminal 100 according to an embodiment of the present invention. Processing corresponding to this flow chart can be realized by the control unit 101, reading out a corresponding processing program recorded in, for example, the ROM 102, loading it into the RAM 103 and executing it.

In step S601, the control unit 101 determines whether or not operation input was made by a user. Specifically, the control unit 101 make the determination based on whether or not it received a control signal corresponding to operation input from the operation input unit 106. In the case where the control unit 101 determines that operation input was made by a user, it moves the processing on to step S602, and when it determined that operation input was not made, it repeats the processing of this step.

In step S602, the control unit 101 analyzes the control signal corresponding to the operation input and determines whether or not the operation input made by the user is operation input that corresponds to an operation for which it is predetermined that responsiveness of display updating in response to operation input is required. Operation for which responsiveness of screen updating in response to operation input is required may be, for example:

selection of a command sorted hierarchically;
display of input trajectory on a touch panel; or
status change due to use of an item, or the like. Note, information of an operation for which responsiveness of screen updating is required is something that is provided to the portable terminal 100 from the server 200.

The control unit 101 moves the processing on to step S603 in the case where it determines that the operation input made by the user is operation input for which responsiveness of screen updating is required, and moves the processing on to step S604 in the case where it determines that it is operation input for which responsiveness of screen updating is not required.

In step S603, the control unit 101 reads GUI data, corresponding to the operation input detected in step S601, from amongst GUI data for operation input stored in the RAM 103. Next, the control unit 101 transmits a secondary screen for operation input generated using the read out GUI data to the display control unit 104, thereby causing it to be displayed on the display unit 105.

In step S604, the control unit 101 determines whether or not to transmit the operation input made by the user to the server 200. This determination may be carried out according to whether or not, for example, a final determination of a command, or the completion of continued input on a touch panel was detected. In a case where the control unit 101 determines that it will transmit the operation input to the server 200, it completes the on-terminal processing, and when it determines that it will not transmit the operation input, it returns the processing to step S601.

Thus, on the portable terminal 100 in the present embodiment, in a case where operation input for which responsiveness of screen updating is required is made, by updating display on the display unit 105, a suitable response display can be provided without a time lag to the user in response to operation input.

Note that while in the present embodiment, example was given of usage of game content provided by the server 200 in which an operation input device and a screen display device were separate, embodiment of the present invention is not limited to this. For example, the content provided by the server 200 is not limited to game content, and may be video of a video distribution service such as so-called VOD. In this case, the operation input device may provide a playback control UI or a playback content selection function, and may, for example, carry out the updating of a GUI on the operation input device when a current progress position is changing on a progress bar.

Also, while in the present embodiment, explanation was made using display updating as the only operation for which responsiveness to operation input was required, the present invention is not limited to this. Corresponding operation carried out in response to operation input may be, for example, audio playback corresponding to operation input, or the vibration of an operation input device using a motor, etcetera. In this case, information of the audio data to be played back or the vibration pattern is provided beforehand to the operation input device to the server 200.

As explained above, a content service, in which it is possible to provide a wide range of operation input to a user, can be realized on the content providing system of the present embodiment in which a screen generated on a server is provided to a client device. Also, because a general purpose application such as a web browser application can be used to realize the system, a user need not purchase multiple specific devices in order to use the content. Furthermore, because there is no need to provide a custom communication function between the operation input device and the screen display device, the service can be provided without using a platform that supports communication between these devices.

This application claims the benefit of Japanese Patent Application No. 2012-146068, filed Jun. 28, 2012, which is hereby incorporated by reference herein in its entirety.

What is claimed is:

1. A content providing system in which a server provides a screen, that the server rendered according to input carried out on a first device, to a second device, wherein the first device comprises:
    a first device receiver which is able to receive from the server, and store in a storage, operation data which indicates a predetermined operation for which responsiveness is required;
    a detector which is able to detect an operation input carried out on the first device;
    a first device processor which is able to read from the storage, and execute, when the detected operation input is the predetermined operation that requires responsiveness, the operation data which indicates the predetermined operation; and
    a first device transmitter which is able to transmit operation input data indicating the detected operation input to the server, the server comprises:
    a server receiver which is able to receive the operation input data from the first device;
    an updater which is able to update data for screen generation according to the received operation input data;
    a renderer which is able to render a screen according to the updated data for screen generation;
    a server processor which is able to determine whether the first device is associated with the second device based on whether operation input device identification information identifying the first device is stored in a memory in association with screen display device identification information identifying the second device; and
    a server transmitter which is able to transmit the rendered screen to the second device when the first device is associated with the second device, and the second device comprises:
    a second device receiver which is able to receive the rendered screen from the server; and
    a second device display controller which is able to display on a second device display, to which the second device display controller is connected, a received screen.

2. The content providing system according to claim 1, wherein the first device processor is able to determine whether or not the detected operation input is to be transmitted to the server, and in a case where the first device processor determines that the detected operation input is to be transmitted to the server, the first device transmitter generates, and sends to the server, the operation input data indicating the detected operation input.

3. The content providing system according to claim 1, wherein the predetermined operation requires responsiveness of display updating of a first device display of the first device.

4. The content providing system according to claim 1, wherein the first device further comprises:
  a first device display which is able to display display data; and
  a first device display controller which is able to control display of the display data on the first device display,
the operation data is display data related to the predetermined operation,
the first device display controller:
  displays, on the first device display, at least a part of the display data related to the predetermined operation stored in the storage; and
  in a case where the detected operation input is the predetermined operation that requires responsiveness, converts display details of the first device display into display data corresponding to the predetermined operation.

5. The content providing system according to claim 4, wherein the second device display controller and the first device display controller are browsing applications of the second device and the first device respectively, and
a rendered screen and display data related to the detected operation input are displayed on the second device display or the first device display by the browsing applications.

6. The content providing system according to claim 1, wherein the predetermined operation includes an audio playback or a vibration of the first device.

7. The content providing system according to claim 1, wherein the server further comprises an encoder which is able to generate encoded video data by encoding the rendered screen,
the server transmitter transmits the rendered screen in a form of the encoded video data generated by the encoder,
the second device further comprises a decoder which is able to decode the rendered screen from the encoded video data received by the second device receiver, and
the second device display controller displays a decoded screen on the second device display.

8. The content providing system according to claim 1, wherein the first device executes a first login process with the server,
the second device executes a second login process with the server, and the server processor stores the operation input device identification information identifying the first device in the memory in association with the screen display device identification information identifying the second device in response to the first login process and the second login process succeeding.

9. The content providing system according to claim 8, wherein the server does not transmit the rendered screen to the second device until both the first login process and the second login process succeed.

10. A control method for a content providing system in which a server provides a screen, that the server rendered according to input carried out on a first device, to a second device, the control method comprising:

in the first device:
  receiving, from the server, and storing in a storage, operation data which indicates a predetermined operation for which responsiveness is required;
  detecting an operation input carried out on the first device;
  reading, from the storage, and executing, when the detected operation input is the predetermined operation that requires responsiveness, the operation data which indicates the predetermined operation; and
  transmitting operation input data indicating the detected operation input to the server, in the server:
  receiving the operation input data from the first device;
  updating data for screen generation according to the received operation input data;
  rendering a screen according to the updated data for screen generation;
  determining whether the first device is associated with the second device based on whether operation input device identification information identifying the first device is stored in a memory in association with screen display device identification information identifying the second device; and
  transmitting the rendered screen to the second device when the first device is associated with the second device, and in the second device:
  receiving the rendered screen from the server; and
  displaying, on a second device display to which the second device is connected, a received screen.

11. The control method according to claim 10, further comprising:

in the first device, executing a first login process with the server,
in the second device, executing a second login process with the server, and
in the server, storing the operation input device identification information identifying the first device in the memory in association with the screen display device identification information identifying the second device in response to the first login process and the second login process succeeding.

12. The control method according to claim 11, wherein the server does not transmit the rendered screen to the second device until both the first login process and the second login process succeed.

* * * * *